US009401049B2

(12) United States Patent
Kim et al.

(10) Patent No.: US 9,401,049 B2
(45) Date of Patent: Jul. 26, 2016

(54) AUGMENTED REALITY SYSTEM USING MOVING CEILING TRANSPARENT DISPLAY FOR SHIP AND METHOD FOR ENABLING SAME

(75) Inventors: Sun Young Kim, Daejeon (KR); Jae Yong Oh, Daejeon (KR); Se Kil Park, Daejeon (KR)

(73) Assignee: KOREA INSTITUTE OF OCEAN SCIENCE AND TECHNOLOGY, Gyeonggi-do (KR)

( * ) Notice: Subject to any disclaimer, the term of this patent is extended or adjusted under 35 U.S.C. 154(b) by 148 days.

(21) Appl. No.: 14/233,747

(22) PCT Filed: Jul. 20, 2012

(86) PCT No.: PCT/KR2012/005800
§ 371 (c)(1),
(2), (4) Date: Jan. 18, 2014

(87) PCT Pub. No.: WO2013/012279
PCT Pub. Date: Jan. 24, 2013

(65) Prior Publication Data
US 2014/0160165 A1 Jun. 12, 2014

(30) Foreign Application Priority Data
Jul. 21, 2011 (KR) ........................ 10-2011-0072440

(51) Int. Cl.
*G09G 5/00* (2006.01)
*G06T 19/00* (2011.01)
(Continued)

(52) U.S. Cl.
CPC ............... *G06T 19/006* (2013.01); *G06T 11/00* (2013.01); *G08G 3/02* (2013.01)

(58) Field of Classification Search
CPC .............................. G06T 19/006; G06T 19/00
USPC ......................................................... 345/633
See application file for complete search history.

(56) References Cited

U.S. PATENT DOCUMENTS

2007/0027591 A1* 2/2007 Goldenberg et al. ........... 701/23
2007/0053551 A1* 3/2007 Kubo et al. ................... 382/106
(Continued)

FOREIGN PATENT DOCUMENTS

JP 2005-233712 9/2005
JP 2010-076524 4/2010
(Continued)

*Primary Examiner* — Devona Faulk
*Assistant Examiner* — Jin Ge
(74) *Attorney, Agent, or Firm* — Adam Warwick Bell; Matthew Rupert Kaser

(57) ABSTRACT

In an augmented reality system using a moving ceiling transparent display for a ship, according to the present invention, the moving ceiling transparent display is movably installed on the ceiling of a steering house of the ship, and the system comprises: a recognition portion for recognizing the location of the ship and the direction of the head and the pupils of a sailor; a reception portion for receiving external image data from an external landscape database with respect to an external landscape, in accordance with the location of the ship and the direction of the head and the pupils of the sailor; a matching portion for adjusting a match between the external image data, which is received by the receiving portion, and an actual external image through the window; and an output portion for outputting through the transparent display information on the external image data, which is adjusted through the matching portion, on the location of the actual external image.

13 Claims, 5 Drawing Sheets

(51) Int. Cl.
*G06T 11/00* (2006.01)
*G08G 3/02* (2006.01)

(56) References Cited

U.S. PATENT DOCUMENTS

| | | | |
|---|---|---|---|
| 2008/0015772 A1* | 1/2008 | Sanma et al. | 701/207 |
| 2009/0271054 A1* | 10/2009 | Dokken | 701/21 |
| 2010/0238161 A1* | 9/2010 | Varga et al. | 345/419 |
| 2010/0253542 A1* | 10/2010 | Seder et al. | 340/932.2 |
| 2011/0084870 A1* | 4/2011 | Kondo et al. | 342/41 |
| 2011/0144912 A1* | 6/2011 | Lee et al. | 701/301 |
| 2011/0227717 A1* | 9/2011 | Kumon | 340/441 |
| 2011/0268262 A1* | 11/2011 | Jones et al. | 379/202.01 |
| 2012/0026108 A1* | 2/2012 | Sugita et al. | 345/173 |

FOREIGN PATENT DOCUMENTS

| | | | |
|---|---|---|---|
| JP | 2010-076524 | * | 8/2010 |
| KR | 10-1004126 | | 12/2010 |

* cited by examiner

AUGMENTED REALITY SYSTEM USING MOVING CEILING TRANSPARENT DISPLAY FOR SHIP AND METHOD FOR ENABLING SAME

TECHNICAL FIELD

The present invention relates to a marine augmented reality system using a moving ceiling transparent display and a method of implementing the system.

BACKGROUND ART

Augmented reality denotes a new environment created by combining a real world viewed by a user with his or her eyes with a virtual world having additional information. Research and development into an augmented reality system in which a real environment and a virtual environment are merged has been conducted in the United States and Japan since the late 1990s. Augmented reality, which is the concept of supplementing the real world with the virtual world, uses a virtual environment created with computer graphics, but the main entity thereof is the real environment. Computer graphics function to additionally provide information required for the real environment.

Further, even for a transparent display device for simultaneously displaying the real environment and the virtual environment, a transparent display device using a transparent electronic element has been developed with the development of recent display technology. Such a transparent display device is implemented by stacking a transparent electrode, transparent semiconductor, a transparent dielectric, etc. on a transparent glass or a transparent plastic material. A luminous surface is implemented using an Organic Light Emitting Diode (OLED), an inorganic Light Emitting Diode (LED), or a Liquid Crystal Display (LCD).

In a ship navigation system, conventional technology provides a safe ship navigation method using an Electronic Chart Display and Information System (ECDIS) having wave information, which precisely measures wave information through radar, and shares such wave information with the ECDIS while displaying the wave information via the ECDIS, and which can improve the stability of ship navigation based on the wave information and ECDIS information, as disclosed in Korean Patent Application No. 10-2007-0037443 entitled "Safe ship navigation method using ECDIS having wave information."

However, in order to improve the stability of such ship navigation, there is a limitation in using only the ECDIS, and there is a need to apply an augmented reality system so as to secure the stability of ships and extend the efficiency and precision of ship navigation by simultaneously displaying various types of information related to the real environment and pieces of virtual information required for the navigation of a ship and by helping the captain of the ship make a decision in an emergency.

DISCLOSURE

Technical Problem

The present invention relates to a marine augmented reality system and an augmented reality implementation method using a moving ceiling transparent display to solve the above problems occurring in the prior art, and an object of the present invention is to secure the stability of ship navigation and prevent the occurrence of accidents caused by careless navigation by adding information about the external background and objects of a ship viewed by a user to the background and the objects as a virtual environment based on the system and method, by allowing information required for navigation to be viewed at a glance, and by enabling various and complicated pieces of navigation information to be intuitively determined.

Technical Solution

In order to accomplish the above object, a marine augmented reality system using a moving ceiling transparent display the present invention provides (claims copy) includes a moving ceiling transparent display movably installed on a ceiling of a steering room of a ship; a recognition unit for recognizing a location of the ship and a head direction and a gaze direction of a navigator; a reception unit for receiving information of external image data from an external topographic database (DB) related to external topography depending on the location of the ship and the head direction and the gaze direction of the navigator; a registration unit for adjusting the external image data received by the reception unit so that the external image data is registered in real external images via glass windows; and an output unit for outputting the information of the external image data adjusted by the registration unit at locations of the real external images via the moving ceiling transparent display.

Further, according to the present invention, the recognition unit may include a Global Positioning System (GPS) to recognize a movement speed and the location of the ship and include a recognition sensor for recognizing the head direction and the gaze direction of the navigator.

Furthermore, according to the present invention, the moving ceiling transparent display may move along the ceiling in the head direction and the gaze direction of the navigator, sensed by the recognition sensor.

Furthermore, according to the present invention, the moving ceiling transparent display may move along a rail part attached to the ceiling.

Furthermore, according to the present invention, the external image data may be implemented using three-dimensional (3D) data.

Furthermore, according to the present invention, the reception unit may receive a chart from a chart DB depending on a navigation location of the ship, the registration unit may adjust the chart so that the chart is registered in the real external images, and the output unit may display a route of the ship on the moving ceiling transparent display.

Furthermore, according to the present invention, the reception unit may receive information about inland waterways, submarine topography, weather, and sea area characteristics from an Electronic Chart Display and Information System (ECDIS) including the information about inland waterways, submarine topography, weather, and sea area characteristics, the registration unit may adjust the received information about inland waterways, submarine topography, weather, and sea area characteristics so that the received information is registered in real external images, and the output unit may output the information about inland waterways, submarine topography, weather, and sea area characteristics via the moving ceiling transparent display.

Furthermore, according to the present invention, the reception unit may receive information about surrounding ships navigating on sea from an Automatic Identification System (AIS), the registration unit may adjust the information about the surrounding ships so that the information is registered in the real external images, and the output unit may output the information about the surrounding ships via the moving ceiling transparent display.

Furthermore, according to the present invention, the registration unit may adjust sizes of the surrounding ships received from the AIS depending on preset templates for respective sizes of surrounding ships, and the output unit may output the templates of the surrounding ships via the moving ceiling transparent display.

Furthermore, according to the present invention, the reception unit may receive information about an external moving object from radar, the registration unit may adjust a movement speed and a location of the moving object so that the moving object is registered in the real external images, and the output unit may output the moving object via the moving ceiling transparent display.

Furthermore, according to the present invention, if the moving object is not a surrounding ship received from the AIS, the registration unit may adjust the moving object so that the moving object is registered in the real external images, and the output unit displays the moving object via the moving ceiling transparent display.

Furthermore, according to the present invention, if external illuminance of the ship is less than a preset value, the ship may be displayed using a preset template at a location on the real external images.

In another embodiment of the present invention, a marine augmented reality system using a moving ceiling transparent display may include a moving ceiling transparent display movably installed on a ceiling of a steering room of a ship; a recognition unit for recognizing a location of the ship and a head direction and a gaze direction of a navigator; a reception unit for receiving information of external image data from an external topographic database (DB) related to external topography depending on the location of the ship and the head direction and the gaze direction of the navigator; a registration unit for adjusting the external image data received by the reception unit so that the external image data is registered in real external images via glass windows; and an output unit for outputting the information of the external image data adjusted by the registration unit at locations of the real external images via the moving ceiling transparent display, wherein the reception unit includes a calculation unit for receiving and calculating information about inland waterways, submarine topography, weather, and sea area characteristics, information about a movement speed and a route of the ship, information about movement speeds and routes of surrounding ships, and information about a movement speed and a route of a moving object, and wherein risk factors of the ship over time are predicted at preset time intervals.

Further, according to the present invention, the risk factors may include a risk of a collision with the submarine topography, a risk of a collision with the surrounding ships, a risk of a distress caused by weather conditions, a risk of a distress caused by sea area characteristics, and a risk of a collision with external topography.

Furthermore, according to the present invention, the marine augmented reality system may further include an alarm unit for performing an alarm function when the risk factors are discovered.

Furthermore, according to the present invention, the marine augmented reality system may further include a control unit for, when the alarm unit activates the alarm function, transmitting a control signal required to automatically change the route of the ship to a navigation control device.

A method of implementing marine augmented reality using a moving ceiling transparent display according to the present invention includes a moving ceiling transparent display movably installed on a ceiling of a steering room of a ship; a recognition step of recognizing a location of the ship and a head direction and a gaze direction of a navigator; a reception step of receiving information of external image data from an external topographic database (DB) related to external topography depending on the location of the ship and the head direction and the gaze direction of the navigator; a registration step of adjusting registration between the external image data received by the reception unit and real external images via glass windows; and an output step of outputting the information of the external image data adjusted by the registration unit at locations of the real external images via the moving ceiling transparent display.

Further, according to the present invention, the reception step may be configured to receive a chart from a chart DB depending on a navigation location of the ship, the registration step may be configured to adjust the chart so that the chart is registered in the real external images, and the output step may be configured to display a route of the ship on the moving ceiling transparent display.

Furthermore, according to the present invention, the reception step may be configured to receive information about inland waterways, submarine topography, weather, and sea area characteristics from an Electronic Chart Display and Information System (ECDIS) including the information about inland waterways, submarine topography, weather, and sea area characteristics, the registration step may be configured to adjust the received information about inland waterways, submarine topography, weather, and sea area characteristics so that the received information is registered in real external images, and the output step may be configured to output the information about inland waterways, submarine topography, weather, and sea area characteristics via the moving ceiling transparent display.

Furthermore, according to the present invention, the reception step may be configured to receive information about surrounding ships navigating on sea from an Automatic Identification System (AIS), the registration step may be configured to adjust the information about the surrounding ships so that the information is registered in the real external images, and the output step may be configured to output the information about the surrounding ships via the moving ceiling transparent display.

Furthermore, according to the present invention, the reception step may be configured to receive information about an external moving object from radar, the registration step may be configured to adjust a movement speed and a location of the moving object so that the moving object is registered in the real external images, and the output step may be configured to output the moving object via the moving ceiling transparent display.

Furthermore, according to the present invention, the method may further include a calculation step of calculating information about inland waterways, submarine topography, weather, and sea area characteristics, information about a movement speed and a route of the ship, information about movement speeds and routes of surrounding ships, and information about a movement speed and a route of a moving object, wherein risk factors of the ship over time are predicted at preset time intervals.

Furthermore, according to the present invention, the risk factors may include a risk of a collision with the submarine topography, a risk of a collision with the surrounding ships, a risk of a distress caused by weather conditions, a risk of a distress caused by sea area characteristics, and a risk of a collision with external topography, the method further including an alarm step of performing an alarm function when the risk factors are discovered.

Furthermore, according to the present invention, the method may further include a control step of, when the alarm function is activated at the alarm step, transmitting a control signal required to automatically change the route of the ship to a navigation control device.

Advantageous Effects

An object of the present invention is to provide an apparatus and method for implementing a more realistic augmented reality than conventional technology by adding a virtual environment to a background and objects viewed by a user.

Further, among the causes of various ship accidents, accidents caused by careless navigation occupy a large portion, and the reason for this has been understood to be attributable to the feeling of fatigue felt by a navigator. A marine augmented reality system using a moving ceiling transparent display according to the present invention is advantageous in that it allows a navigator to view and understand pieces of various and complicated navigation information at a glance, thus improving his or her intuitive determination ability and preventing marine accidents.

Furthermore, since a moving ceiling transparent display is used, the moving ceiling transparent display provides information about real external images while moving to a place viewed by the user, and thus there are advantages in that there is no need to install expensive transparent display equipment on all glass windows of a steering room, thus reducing installation costs, and in that depending on the tendency of a navigator, navigation can be performed even in a state in which a ceiling type display is inserted into the ceiling and is turned off.

BEST MODE

Figure 1:
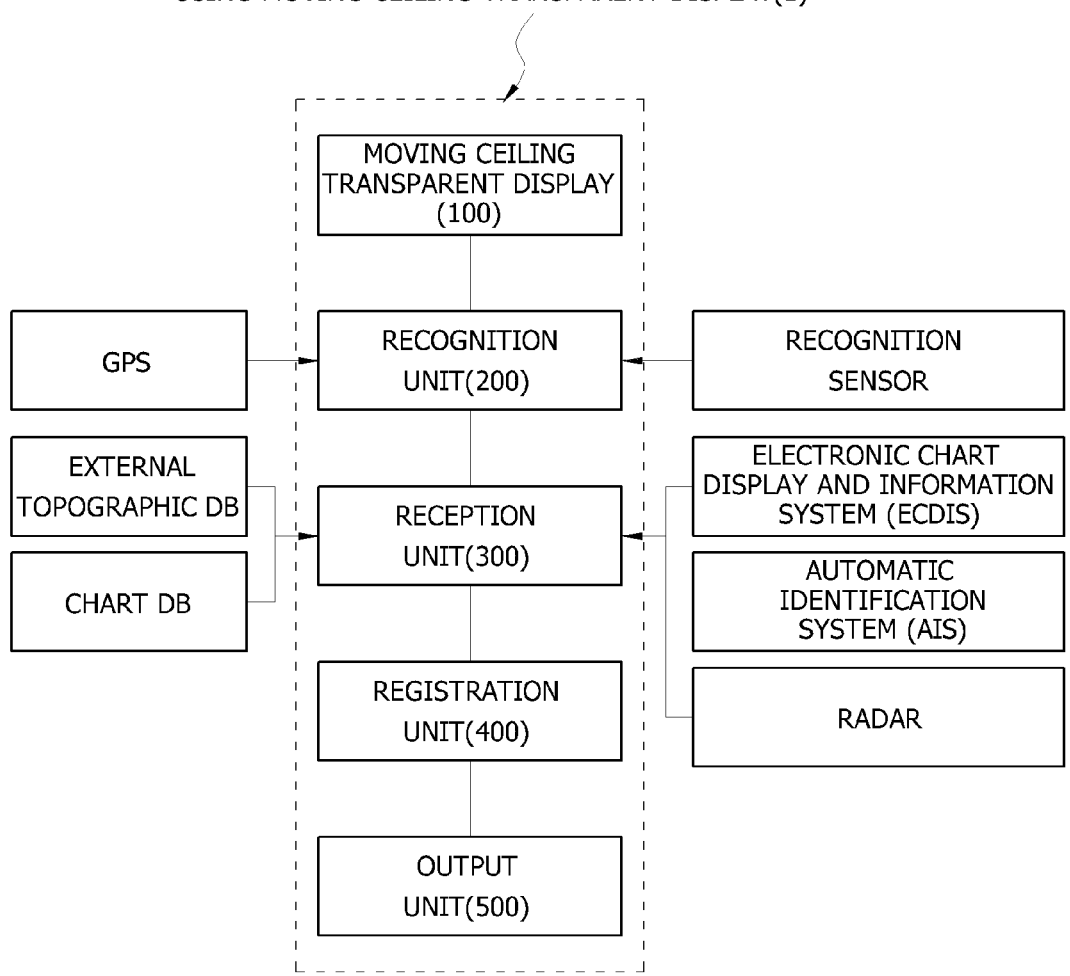
FIG. 1 is a block diagram showing a marine augmented reality system using a moving ceiling transparent display according to the present invention.

Hereinafter, embodiments of the present invention will be described in detail with reference to the attached drawings. It should be noted that the same reference numerals are used throughout the different drawings to designate the same components or parts. In the following description, detailed descriptions of known functions and elements that may unnecessarily make the gist of the present invention obscure will be omitted.

Augmented reality technology is technology for mixing real images with virtual images and representing mixed images, and is capable of providing information more intuitively by overlapping navigation-supporting information with external images viewed by a navigator and outputting the overlapped images.

An augmented reality technology-based intelligent navigation-supporting system is a new navigation system concept that combines image mixing technology for Closed Circuit Television (CCTV) cameras and transparent displays, three-dimensional (3D) matching technology, sensor data fusion technology, and intelligent navigation technology, and provides resulting navigation information in the form of information easily understandable by a navigator, thus improving navigation safety and information delivery efficiency.

A navigation-supporting system using augmented reality (AR) technology must register real visual information to virtual information, wherein the location of visual information varies depending on the location and the gaze direction of a user, and thus the location and the gaze direction of the user must be exactly detected using cameras or various sensors.

A navigation information provision system using augmented reality (AR) technology may be utilized in the collision avoidance of ships, the control of a marine traffic flow, ship monitoring, etc. using a real-time marine information provision system, electronic charts, an Automatic Identification System (AIS), or the like.

FIG. 1 is a block diagram showing a marine augmented reality system using a moving ceiling transparent display according to the present invention.

As shown in FIG. 1, a marine augmented reality system 1 using a moving ceiling transparent display according to the present invention includes a moving ceiling transparent display 100, a recognition unit 200, a reception unit 300, a registration unit 400, and an output unit 500.

The recognition unit 200 recognizes the current movement speed and location of a ship using a Global Positioning System (GPS), and senses and recognizes the gaze direction of a navigator using a recognition sensor configured to recognize the head direction and gaze direction of the navigator.

For the recognition sensor, a pupil recognition camera for recognizing the gaze direction of the navigator and a recognition camera for recognizing the head direction of the navigator may be separately configured, and may be integrated into a single sensor for simultaneously recognizing the gaze direction and head direction of the navigator.

The moving ceiling transparent display 100 installed on the ceiling is movable along the ceiling in directions which are recognized by the recognition sensor, that is, the head direction of the navigator, and the direction of the motion of the pupil of the navigator, that is, the gaze direction in which the navigator faces.

On the ceiling, a rail part 900 is installed along the periphery of the glass windows of a steering room, and thus the moving ceiling transparent display 100 is installed to be freely moved while being spaced apart from the glass windows by a predetermined interval.

Since the moving ceiling transparent display 100 is moved along the rail part 900 in the movement direction of the gaze of the navigator in consideration of the head direction and gaze direction of the navigator sensed by the recognition sensor for recognizing the head direction and gaze direction of the navigator, there is an advantage in that the installation area of the transparent display is reduced compared to a case where all glass windows of the steering room are transparent displays, thus decreasing installation costs. Further, when the moving ceiling transparent display 100 on the ceiling is turned off, it is brought into close contact with the ceiling or is inserted into the ceiling, thus allowing the navigator to adopt a scheme for navigating the ship with his or her naked eyes using external information, such as that of radar, an AIS, a GPS, an ECDIS, and a chart database (DB), as in the case of an existing navigation scheme.

The reception unit 300 receives external image data from an external topographical database (DB) related to external topography depending on the location of the ship and directions in which the head and gaze of the navigator are turned.

A registration procedure for exactly registering the location of the received external image data to the locations of real external images viewed by the navigator is performed by the registration unit 400, and the output unit 500 outputs various types of information of the external image data registered by the registration unit 400, that is, information about land, buoys, etc., at the locations of the real external images via the moving ceiling transparent display 100.

In order to effectively apply the external image data to the procedure of registering in the real external images, and allow the navigator to easily view real navigation information, the external image data is preferably implemented using 3D data. That is, it is preferable to construct the external topographic DB related to external topography by using 3D data.

Figure 2:
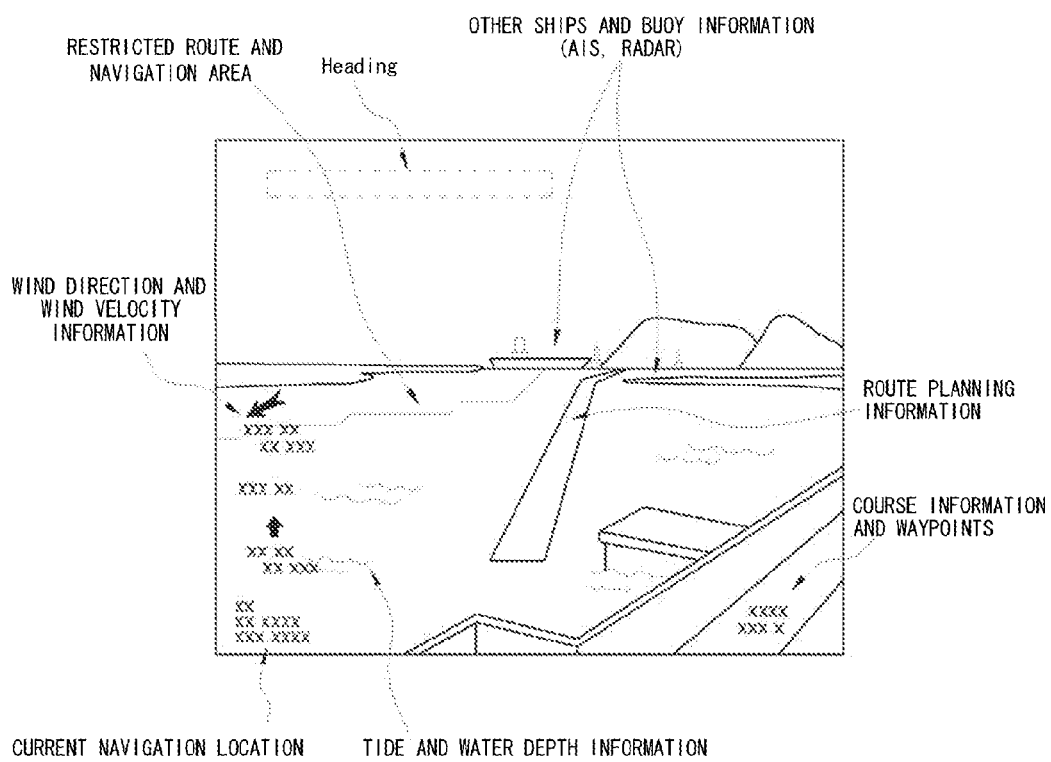
FIG. 2 is a schematic diagram showing a moving ceiling transparent display according to the present invention.

FIG. 2 is a schematic diagram showing the moving ceiling transparent display according to the present invention.

As shown in FIG. 2, various types of navigation information may be displayed on the moving ceiling transparent display 100, and various types of navigation information may include information about the route of a ship, inland waterways, submarine topography, weather, and sea area characteristics, information about surrounding ships, information about a current navigation location, etc.

The collection of pieces of information about the route planning of the ship among various types of navigation information is performed such that the reception unit 300 of the present invention receives charts from a chart DB depending on the navigation location of the ship, and the registration unit 400 adjusts the received charts so that the charts are registered in the real external images.

The output unit 500 displays the route of the ship on the moving ceiling transparent display 100 based on the exact locations of the charts via the adjustment between the real external images and the received charts.

Similarly, the collection of the pieces of information about inland waterways, submarine topography, weather, and sea area characteristics is performed such that the reception unit 300 receives the pieces of information from the ECDIS, and the registration unit 400 adjusts the pieces of received information about inland waterways, submarine topography, weather, and sea area characteristics so that they are registered to the locations of the real external images.

The output unit 500 displays the information about inland waterways, submarine topography, and weather and sea area characteristics on the moving ceiling transparent display 100 via the adjustment between the real external images and the received information about inland waterways, submarine topography, weather, and sea area characteristics.

Further, the collection of pieces of information about surrounding ships navigating on the sea is also performed such that the reception unit 300 receives the pieces of information about the surrounding ships from an Automatic Identification System (AIS), and the registration unit 400 adjusts the received information about the surrounding ships so that they are registered to the locations of the real external images.

The output unit 500 displays the information about the surrounding ships on the moving ceiling transparent display 100 via the adjustment between the real external images and the received information about the surrounding ships.

In this case, the registration unit 400 selectively adjusts preset templates for respective sizes of the surrounding ships depending on the sizes of the collected surrounding ships, and the output unit 500 displays the selectively adjusted templates on the moving ceiling transparent display 100.

Templates denote objects obtained by previously classifying ships depending on the sizes and types and modeling the ships because 3D models of all ships cannot be created. In a situation with low external illuminance, such ship templates and 3D virtual topographic information are output together, and images output at this time function as virtual reality objects capable of replacing real external images.

In the case where templates are previously configured in this way depending on the sizes of the surrounding ships, if the surrounding ships are displayed with the templates on the moving ceiling transparent display 100, such displaying may be helpful to the collection and determination of navigation information by the navigator because, even if surrounding ships are actually displayed as navigating near the corresponding ship in the information collected by the AIS in night navigation, the navigator cannot identify the surrounding ships with the naked eye and cannot intuitively perceive how close the surrounding ships are to the corresponding ship and how large the surrounding ships are.

The navigator previously sets a reference having low external illuminance such as when the navigation time of a ship is at night or when the weather is cloudy and visibility is low, and the system senses external illuminance in real time using an illuminance sensor, determines that real external images are not identifiable by the naked eye if the sensed external illuminance is lower than the preset value, and displays the real external images using preset templates so as to compensate for inexact determination.

For reference, according to Safety of Life at Sea (SOLARS), a passenger ship, a ship having a length of 100 m or more, a dangerous ship, etc. are obliged to externally transmit information about the corresponding ship, and information about the navigation of such ships is collected by the AIS. AIS, which is automatic identification system, denotes an advanced device for providing navigation information such as the location, route, and speed of a ship in real time. This is a device for preventing a collision between ships at sea, and is an item obligatorily installed on ships according to the International Maritime Organization (IMO), wherein even if surrounding ships cannot be recognized, it is possible to determine the presence of other ships or the moving situations of the ships, with the introduction of the AIS.

The collection of pieces of information about small ships other than surrounding ships that can be collected by the AIS, or moving objects drifting on the sea other than ships is performed such that the reception unit 300 receives the information from radar, and the registration unit 400 adjusts the movement speeds and locations of the moving objects so that the moving objects are registered in real external images, and such that the output unit 500 outputs the adjusted results on the moving ceiling transparent display 100.

Figure 3:
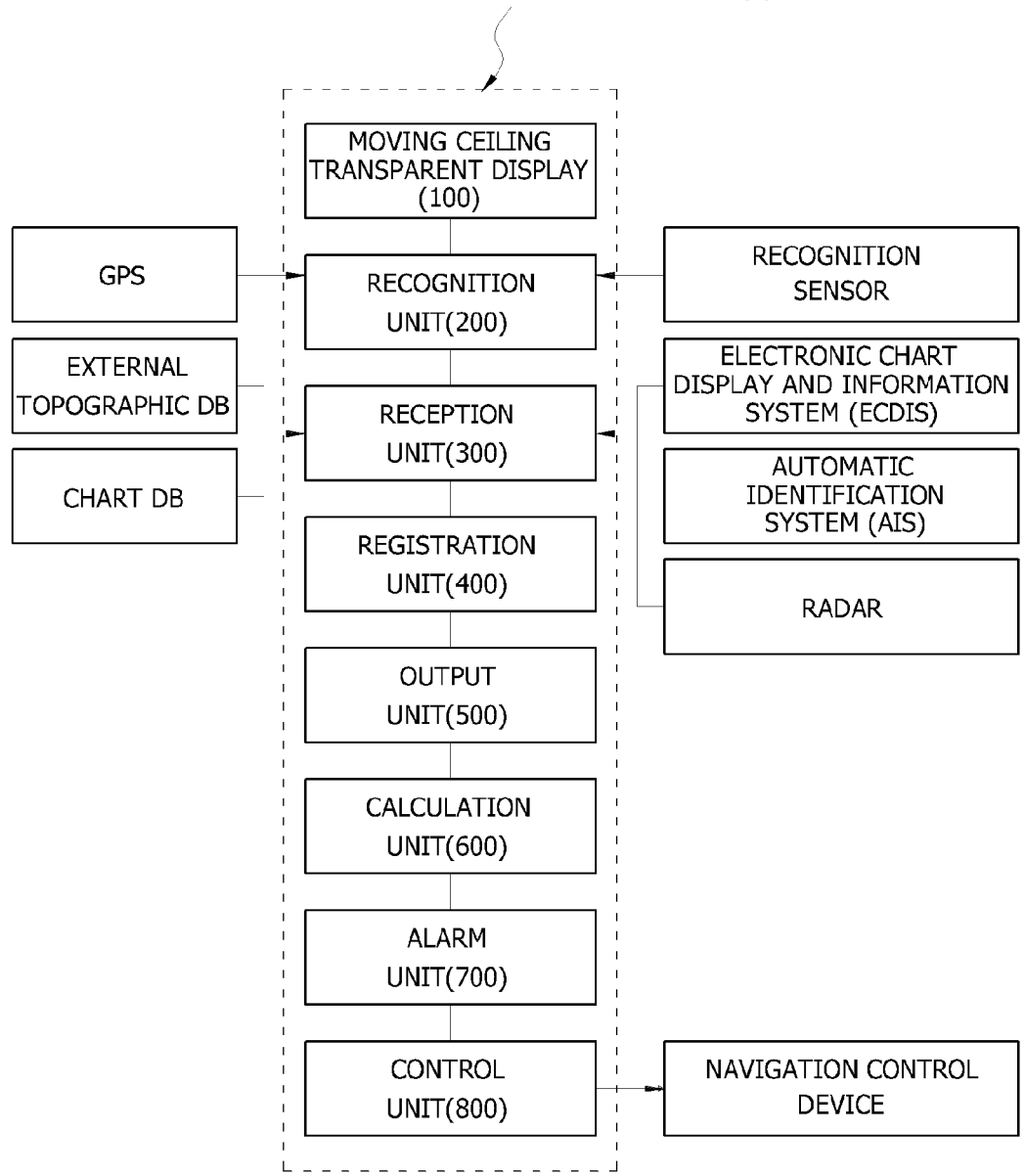
FIG. 3 is a block diagram showing another embodiment of a marine augmented reality system using a moving ceiling transparent display according to the present invention.

FIG. 3 is a block diagram showing another embodiment of a marine augmented reality system using a moving ceiling transparent display according to the present invention.

As shown in FIG. 3, a marine augmented reality system using a moving ceiling transparent display according to the present invention may further include a calculation unit 600 in addition to a moving ceiling transparent display 100, a recognition unit 200, a reception unit 300, a registration unit 400, and an output unit 500.

The calculation unit 600 integrates information about inland waterways, submarine topography, weather, and sea area characteristics, which are received and collected by the reception unit 300 from an ECDIS, information about the current movement speed and route of a ship recognized by the recognition unit 200 through a GPS, information about charts received and collected by the reception unit 300 from a chart DB depending on the navigation location of the ship, and information about surrounding ships navigating on the sea, received and collected by the reception unit 300 from an AIS, and calculates the risk of collisions caused by surrounding ships or moving objects based on the route planning of the ship, inland waterways, or submarine topography such as rocks.

The navigator may previously set time intervals so that calculation of the risk of collisions is performed at regular time intervals by the calculation unit 600, and may predict risk factors at the preset time intervals depending on the movement time of the ship.

Here, the risk factors denote the risk of a collision with submarine topography, the risk of a collision with surrounding ships, the risk of a distress caused by deteriorating weather conditions, the risk of a distress caused by sea area characteristics such as whirlpools or the speed of flowing water, the risk of a collision with external topography such as land or islands, etc.

The present invention may further include an alarm unit 700 for performing the alarm function of providing a warning to the navigator if a risk factor is discovered.

Such an alarm may be implemented using a video alarm such as screen blinking on the moving ceiling transparent display 100 or a sound alarm. Both the alarms may be used, and the type of alarm may be selected by the navigator.

The present invention may further include a control unit 800 configured to, if a risk factor is discovered and an alarm function is activated by the alarm unit 700, transmit a control signal required to automatically change the route planning of the ship to a navigation control device.

By means of this control unit, the marine augmented reality system using the moving ceiling transparent display according to the present invention provides integrated information required for navigation at a glance, together with real images, to the navigator, thus improving a navigator's intuitive determination ability, and prevents the mistakes of the navigator via an automatic route adjustment function, thus blocking collisions at sea.

Figure 4:
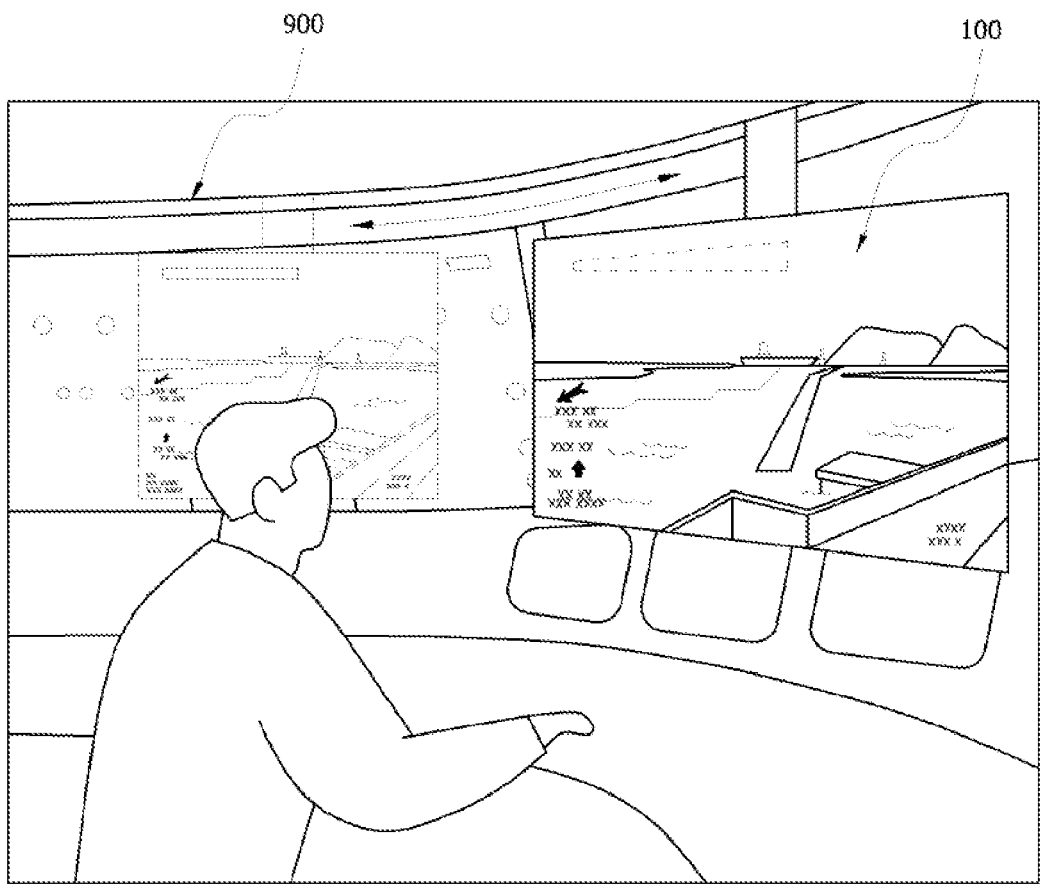
FIG. 4 is a schematic diagram showing a marine augmented reality system using a moving ceiling transparent display according to the present invention.

FIG. 4 is a schematic diagram showing a marine augmented reality system using a moving ceiling transparent display according to the present invention.

As shown in FIG. 4, a navigator may view at a glance various types of information and real external images, displayed on a moving ceiling transparent display 100 movably installed on the ceiling of the steering room of a ship.

Figure 5:
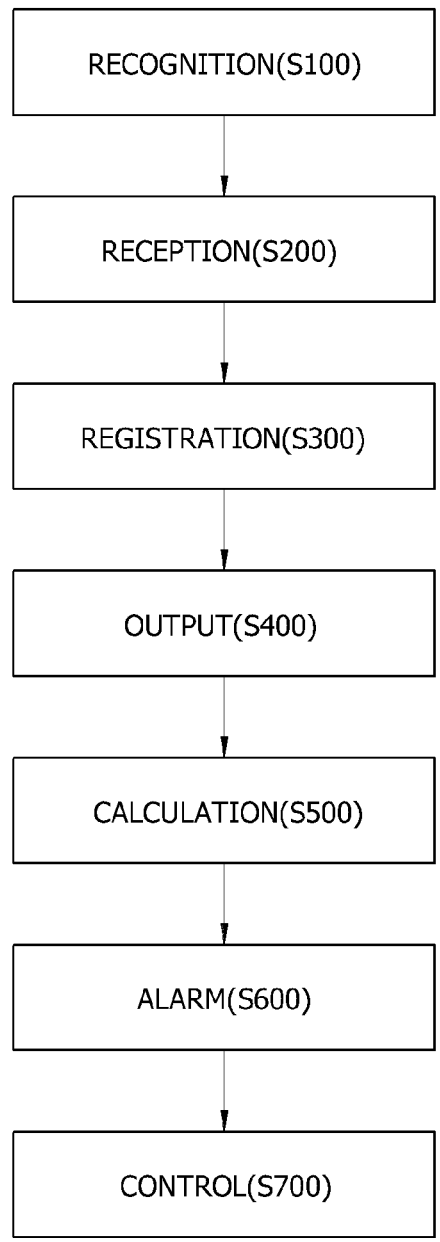
FIG. 5 is a flowchart showing a method of implementing marine augmented reality using a moving ceiling transparent display according to the present invention.

FIG. 5 is a flowchart showing a method of implementing a marine augmented reality using a moving ceiling transparent display according to the present invention.

As shown in FIG. 5, the marine augmented reality implementation method using the moving ceiling transparent display includes the recognition step S100 of recognizing the location of a ship and the head direction and gaze direction of a navigator, the reception step S200 of receiving external image data from an external topographic DB related to external topography depending on the location of the ship and the head and gaze directions of the navigator, the registration step S300 of adjusting registration between the external image data received by the reception unit and real external images, and the output step S400 of outputting the information of the external image data adjusted at the registration step S300 at the locations of the real external images, via the moving ceiling transparent display.

The reception step S200 is configured to receive charts from a chart DB depending on the navigation location of the ship, receive information about inland waterways, submarine topography, weather, and sea area characteristics from an ECDIS including information about inland waterways, submarine topography, weather, and sea area characteristics, receive information about surrounding ships navigating on the sea from an AIS, and receive information about external moving objects from radar, the registration step S300 is configured to perform a registration procedure so that the locations of the real external images are registered to the display locations of the pieces of received information, and the output step S400 is configured to display various types of information on the moving ceiling transparent display.

The present invention may further include the calculation step S500 of calculating such various types of external information, for example, information about inland waterways, submarine topography, weather, and sea area characteristics, the movement speed and route of the ship, the movement speeds and routes of surrounding ships, and the movement speeds and routes of moving objects, in an integrated manner and calculating whether there are risk factors when the ship navigates along the planned route.

The present invention may further include the alarm step S600 of, if risk factors caused by the navigation time of the ship are predicted at regular time intervals preset by the navigator and risk factors are discovered, transmitting an alarm signal to the navigator.

Here, the risk factors may include, but are not limited to, the risk of a collision with submarine topography, the risk of a collision with surrounding ships, the risk of a distress caused by weather conditions, the risk of a distress caused by sea area characteristics, the risk of a collision with external topography, etc.

The present invention may further include the control step S700, if an alarm function is activated at the alarm step S600, transmitting a control signal to a navigation control device so that the route planning of the ship is changed.

Although the present invention has been illustrated and described in relation to preferred embodiments, those skilled in the art will appreciate that various changes, modifications, and substitutions are possible, without departing from the scope and spirit of the invention as disclosed in the accompanying claims.

INDUSTRIAL APPLICABILITY

The present invention may be usefully applied to the fields of augmented reality devices and systems and ship navigation systems.

The invention claimed is:
1. A marine augmented reality system using a moving ceiling transparent display, comprising:
  a moving ceiling transparent display movably installed on a ceiling of a steering room of a ship;
  a recognition unit for recognizing a location of the ship and a head direction and a gaze direction of a navigator;
  a reception unit for receiving information of external image data from an external topographic database (DB) related to external topography depending on the location of the ship and the head direction and the gaze direction of the navigator;

a registration unit for adjusting the external image data received by the reception unit so that the external image data is registered in real external images;

an output unit for outputting the information of the external image data adjusted by the registration unit at locations of the real external images via the moving ceiling transparent display;

a calculation unit for receiving and calculating information about inland waterways, submarine topography, weather, and sea area characteristics, information about a movement speed and a route of the ship, information about movement speeds and routes of surrounding ships, and information about a movement speed and a route of a moving object; and an illuminance sensor for real time sensing of external illuminance, wherein the moving ceiling transparent display moves along the ceiling in the head direction and the gaze direction of the navigator, sensed by the recognition sensor, wherein the moving ceiling transparent display moves along a rail part attached to the ceiling, wherein risk factors of the ship over time are predicted at preset time intervals, and wherein if the illuminance sensor determines that the sensed external illuminance is lower than a preset value, the moving ceiling transparent display displays the real external images using preset templates so as to enhance the visibility.

2. The marine augmented reality system of claim 1, wherein the recognition unit comprises a Global Positioning System (GPS) to recognize a movement speed and the location of the ship and comprises a recognition sensor for recognizing the head direction and the gaze direction of the navigator.

3. The marine augmented reality system of claim 1, wherein the external image data is implemented using three-dimensional (3D) data.

4. The marine augmented reality system of claim 3, wherein:
the reception unit receives a chart from a chart DB depending on a navigation location of the ship,
the registration unit adjusts the chart so that the chart is registered in the real external images, and
the output unit displays a route of the ship on the moving ceiling transparent display.

5. The marine augmented reality system of claim 4, wherein:
the reception unit receives information about inland waterways, submarine topography, weather, and sea area characteristics from an (ECDIS) including the information about inland water ways, submarine topography, weather, and sea area characteristics,
the registration unit adjusts the received information about inland waterways, submarine topography, weather, and sea area characteristics so that the received information is registered in real external images, and
the output unit outputs the information about inland waterways, submarine topography, weather, and sea area characteristics via the moving ceiling transparent display.

6. The marine augmented reality system of claim 5, wherein:
the reception unit receives information about surrounding ships navigating on sea from an Automatic Identification System (AIS),
the registration unit adjusts the information about the surrounding ships so that the information is registered in the real external images, and
the output unit outputs the information about the surrounding ships via the moving ceiling transparent display.

7. The marine augmented reality system of claim 6, wherein the registration unit adjusts sizes of the surrounding ships received from the AIS depending on preset templates for respective sizes of surrounding ships, and the output unit outputs the templates of the surrounding ships via the moving ceiling transparent display.

8. The marine augmented reality system of claim 7, wherein:
the reception unit receives information about an external moving object from radar,
the registration unit adjusts a movement speed and a location of the moving object so that the moving object is registered in the real external images, and
the output unit outputs the moving object via the moving ceiling transparent display.

9. The marine augmented reality system of claim 8, wherein if the moving object is not a surrounding ship received from the AIS, the registration unit adjusts the moving object so that the moving object is registered in the real external images, and the output unit displays the moving object via the moving ceiling transparent display.

10. The marine augmented reality system of claim 9, wherein if external illuminance of the ship is less than a preset value, the ship is displayed using a preset template at a location on the real external images.

11. The marine augmented reality system of claim 1, wherein the risk factors include a risk of a collision with the submarine topography, a risk of a collision with the surrounding ships, a risk of a distress caused by weather conditions, a risk of a distress caused by sea area characteristics, and a risk of a collision with external topography.

12. The marine augmented reality system of claim 1, further comprising an alarm unit for performing an alarm function when the risk factors are discovered.

13. The marine augmented reality system of claim 1, further comprising a control unit for, when the alarm unit activates the alarm function, transmitting a control signal required to automatically change the route of the ship to a navigation control device.

* * * * *